United States Patent
Liguori et al.

(10) Patent No.: US 10,809,975 B2
(45) Date of Patent: Oct. 20, 2020

(54) SHORT DURATION SERIALIZATION EXPRESS QUEUE

(71) Applicant: International Business Machines Corporation, Armonk, NY (US)

(72) Inventors: Gregg L. Liguori, Hyde Park, NY (US); Franklin E. McCune, Tucson, AZ (US); David C. Reed, Tucson, AZ (US); Michael R. Scott, Ocean View, HI (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 15/607,437

(22) Filed: May 27, 2017

(65) Prior Publication Data
US 2018/0341459 A1 Nov. 29, 2018

(51) Int. Cl.
*G06F 5/06* (2006.01)
*H04L 12/875* (2013.01)
*H04M 3/523* (2006.01)

(52) U.S. Cl.
CPC ............ *G06F 5/065* (2013.01); *H04L 47/566* (2013.01); *G06F 2205/065* (2013.01); *H04M 3/523* (2013.01); *H04M 3/5232* (2013.01)

(58) Field of Classification Search
CPC ............ H04M 3/5238; H04M 3/5232; H04M 3/5231; H04M 3/5166; H04M 3/523; H04L 47/30; H04L 47/10; H04L 47/2416; H04L 47/566; G06F 5/065
See application file for complete search history.

(56) References Cited

U.S. PATENT DOCUMENTS

| 6,205,150 | B1 | 3/2001 | Ruszczyk |
| 7,281,086 | B1 | 10/2007 | More et al. |
| 8,370,552 | B2 | 2/2013 | Mittal et al. |
| 8,982,901 | B2 | 3/2015 | Uppunda et al. |
| 2014/0023186 | A1* | 1/2014 | Srinivas ............. H04M 3/5232 379/266.01 |
| 2015/0271089 | A1 | 9/2015 | Tang et al. |

FOREIGN PATENT DOCUMENTS

EP 2985963 A1 2/2016

OTHER PUBLICATIONS

Jabbour, Ravel, et al., "SAF-PS: Starvation Avoidance for Priority Scheduling," 2008 5th International Multi-Conference on Systems, Signals and Devices, IEEE, Jul. 2008.

* cited by examiner

*Primary Examiner* — Ernest Unelus
(74) *Attorney, Agent, or Firm* — Nelson and Nelson; Daniel P. Nelson; Alexis V. Nelson (57) ABSTRACT

A method for allocating a resource to multiple requesters is disclosed. In one embodiment, such a method includes maintaining, for a resource, a regular queue and an express queue. The method receives requests to control the resource and determines, for each request, an anticipated amount of time that the request needs to control the resource. In the event the anticipated amount of time for a request is greater than a selected threshold, the method allocates the request to the regular queue. In the event the anticipated amount of time for a request is less than the selected threshold, the method allocates the request to the express queue. The method provides priority to requests allocated to the express queue over requests allocated to the regular queue. A corresponding system and computer program product are also disclosed.

20 Claims, 7 Drawing Sheets

SHORT DURATION SERIALIZATION EXPRESS QUEUE

BACKGROUND

Field of the Invention

This invention relates to systems and methods for efficiently allocating resources in a concurrent computing environment.

Background of the Invention

Concurrent computing is a form of computing in which several computations are executed during overlapping time periods as opposed to being executed in a sequential manner. One of the primary challenges in implementing a concurrent computing system is providing concurrent control to computing resources, such as data sets, files, services, hardware devices, software resources, storage resources, etc. This typically involves ensuring correct sequencing of interactions or communications between different processes or threads of execution, as well as coordinating access to resources that are shared among the different processes or threads of execution. Potential problems with concurrent computing and associated concurrency control include race conditions, deadlocks, and resource starvation.

Serialization functions may be provided within a concurrent computing environment to enable fair access to serially reusable computing resources. Using these serialization functions, a requester may request exclusive access to a resource (which means the requester and all subsequent requesters may be blocked until that requester is provided access to the resource), or shared access (which means that multiple requesters may be provided simultaneous access to the resource).

Typically, a single queue is used with most serialization functions. Requests to control a resource typically must wait in line in the queue to access the resource. A requester may obtain a resource exclusively or share it with other requesters. Some requesters may only need to control a resource for a very short period of time while other requesters may need to control the resource for a longer period. The position in line typically determines the order in which the resource is accessed.

In view of the foregoing, what are needed are systems and methods to more efficiently allocate a resource to multiple requesters. Ideally, such systems and methods will consider an amount of time requesters need to control the resource when determining how to allocate the resource.

SUMMARY

The invention has been developed in response to the present state of the art and, in particular, in response to the problems and needs in the art that have not yet been fully solved by currently available systems and methods. Accordingly, systems and methods are disclosed to more efficiently allocate a resource to multiple requesters. The features and advantages of the invention will become more fully apparent from the following description and appended claims, or may be learned by practice of the invention as set forth hereinafter.

Consistent with the foregoing, a method for allocating a resource to multiple requesters is disclosed. In one embodiment, such a method includes maintaining, for a resource, a regular queue and an express queue. The method receives requests to control the resource and determines, for each request, an anticipated amount of time that the request needs to control the resource. In the event the anticipated amount of time for a request is greater than a selected threshold, the method allocates the request to the regular queue. In the event the anticipated amount of time for a request is less than the selected threshold, the method allocates the request to the express queue. The method provides priority to requests allocated to the express queue over requests allocated to the regular queue.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1:
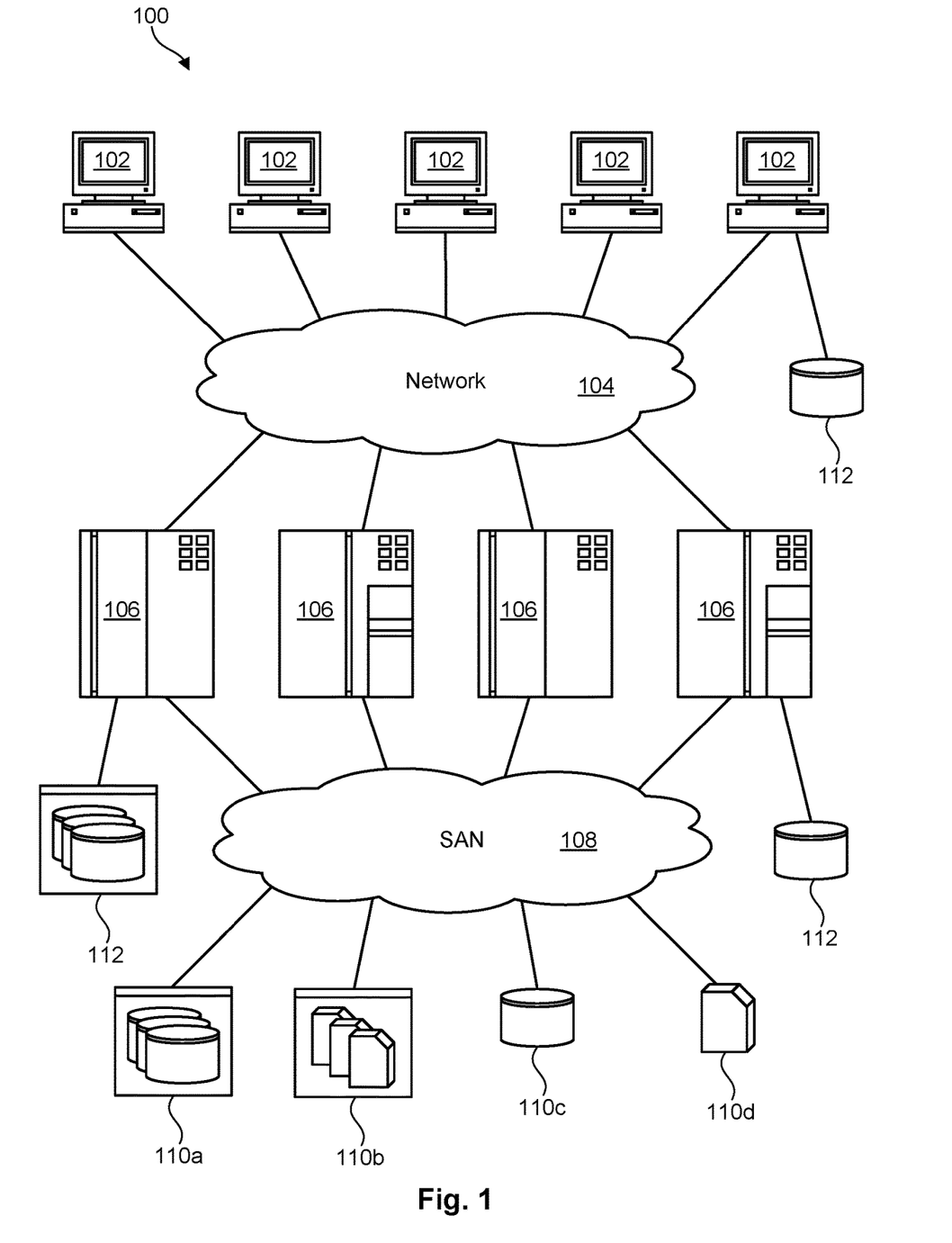
FIG. 1 is a high-level block diagram showing one example of a network environment in which a system and method in accordance with the invention may be implemented.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may utilize the apparatus and methods disclosed herein.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may utilize the systems and methods disclosed herein.

Figure 2:
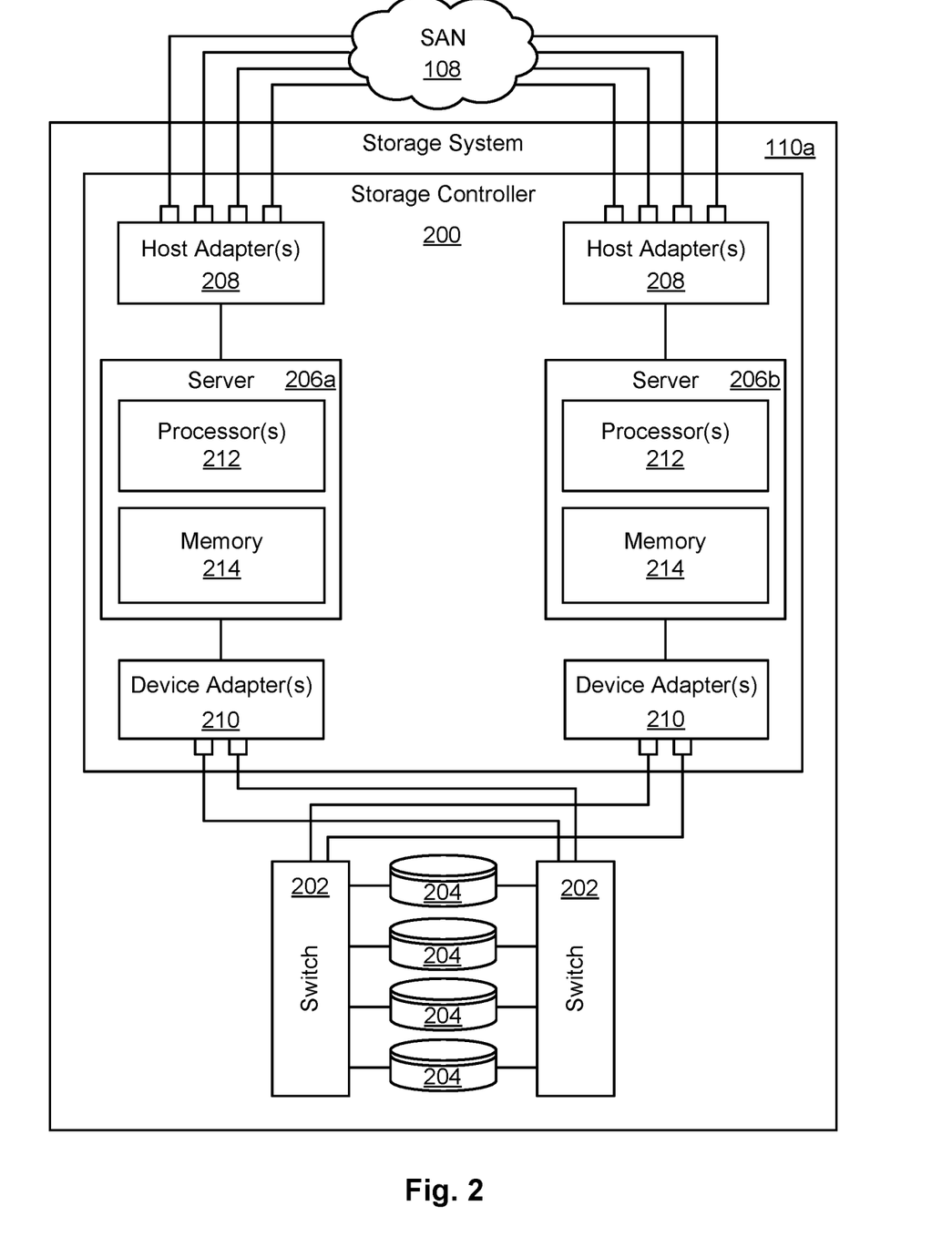
FIG. 2 is a high-level block diagram showing an example of a storage system containing an array of storage drives.

Referring to FIG. 2, one embodiment of a storage system 110a containing an array of hard-disk drives 204 and/or solid-state drives 204 is illustrated. The internal components of the storage system 110a are shown since such a storage system 110a may contain various resources (data sets, files, services, hardware devices, software resources, storage resources, etc.) that another system, job, process, program, or application may control for some period of time. As shown, the storage system 110a includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. These software modules may manage all read and write requests to logical volumes in the storage devices 204.

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to the IBM DS8000™ enterprise storage system 110a, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
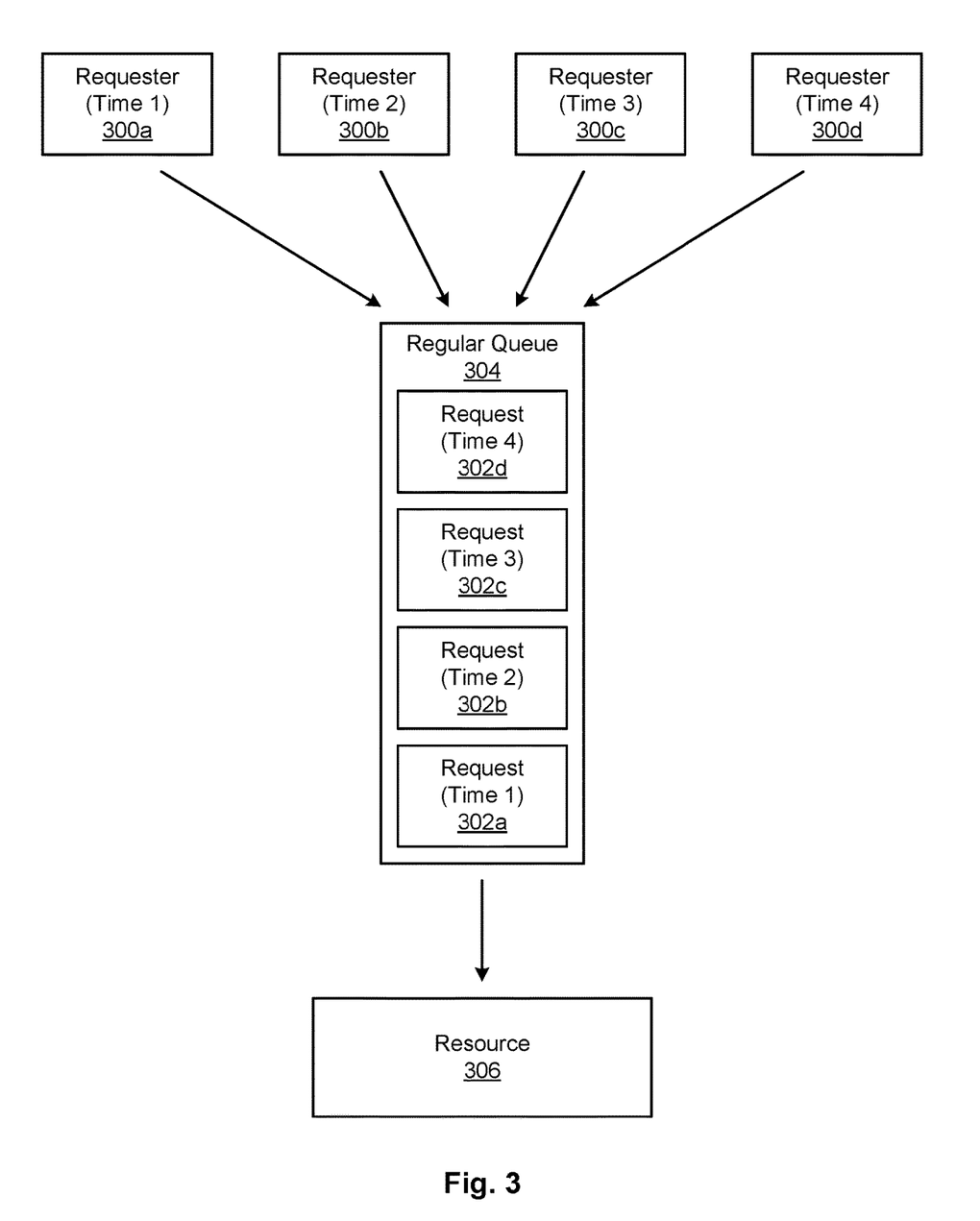
FIG. 3 is a high-level block diagram showing a typical queue used to serialize access to a resource.

Referring to FIG. 3, as previously mentioned, one of the primary challenges in implementing a concurrent computing system is providing concurrent control to computing resources 306, such as data sets, files, services, hardware devices, software resources, storage resources, etc. This typically involves ensuring correct sequencing of interactions or communications between different processes or threads of execution, as well as coordinating access to resources 306 that are shared among the different processes or threads of execution. Potential problems with concurrent computing and associated concurrency control include race conditions, deadlocks, and resource starvation.

Serialization functions may be provided within a concurrent computing environment to enable fair access to serially reusable computing resources 306. Using these serialization functions, a requester 300 may request exclusive access to a resource 306 (which means that requester 300 and all subsequent requesters 300 may be blocked until that requester 300 is provided access to the resource 306), or shared access (which means that multiple requesters 300 may be provided simultaneous access to the resource 306).

As shown in FIG. 3, conventionally, a single queue 304 is used with most serialization functions. Requests 302 to control (e.g., lock out access to other requesters 300, reserve, hold, etc.) a resource 306 typically must wait in line in the queue 304 to access the resource 306. A requester 300 may obtain a resource 306 exclusively or share it with other requesters 300. Some requesters 300 may only need to control a resource 306 for a very short period of time while other requesters 300 may need to control the resource 306 for a longer period. The position in line typically determines the order in which the resource 306 is accessed.

For example, as shown in FIG. 3, using a conventional single queue 304, multiple requesters 300a-d may request access to a resource 306 at different times (Time 1, Time 2, Time 3, and Time 4, where Time 1 is earlier than Time 4). The requests 302 from each of these requesters 300a-d may be ordered in the queue 304 on a first-come, first-serve basis such that request 302a is executed first, followed by request 302b, request 302c, and request 302d, in order. No consideration is typically given to the length of time the requesters 300 need to control the resource 306. Thus a requester 300 that needs to control a resource 306 for a longer period of time may have its request 302 executed prior to a requester 300 that needs to control the resource 306 for a relatively shorter period of time. This may result in inefficient access to the resource 306 since a single long-term requester 300 may hold up many short-term requesters 300.

Figure 4:
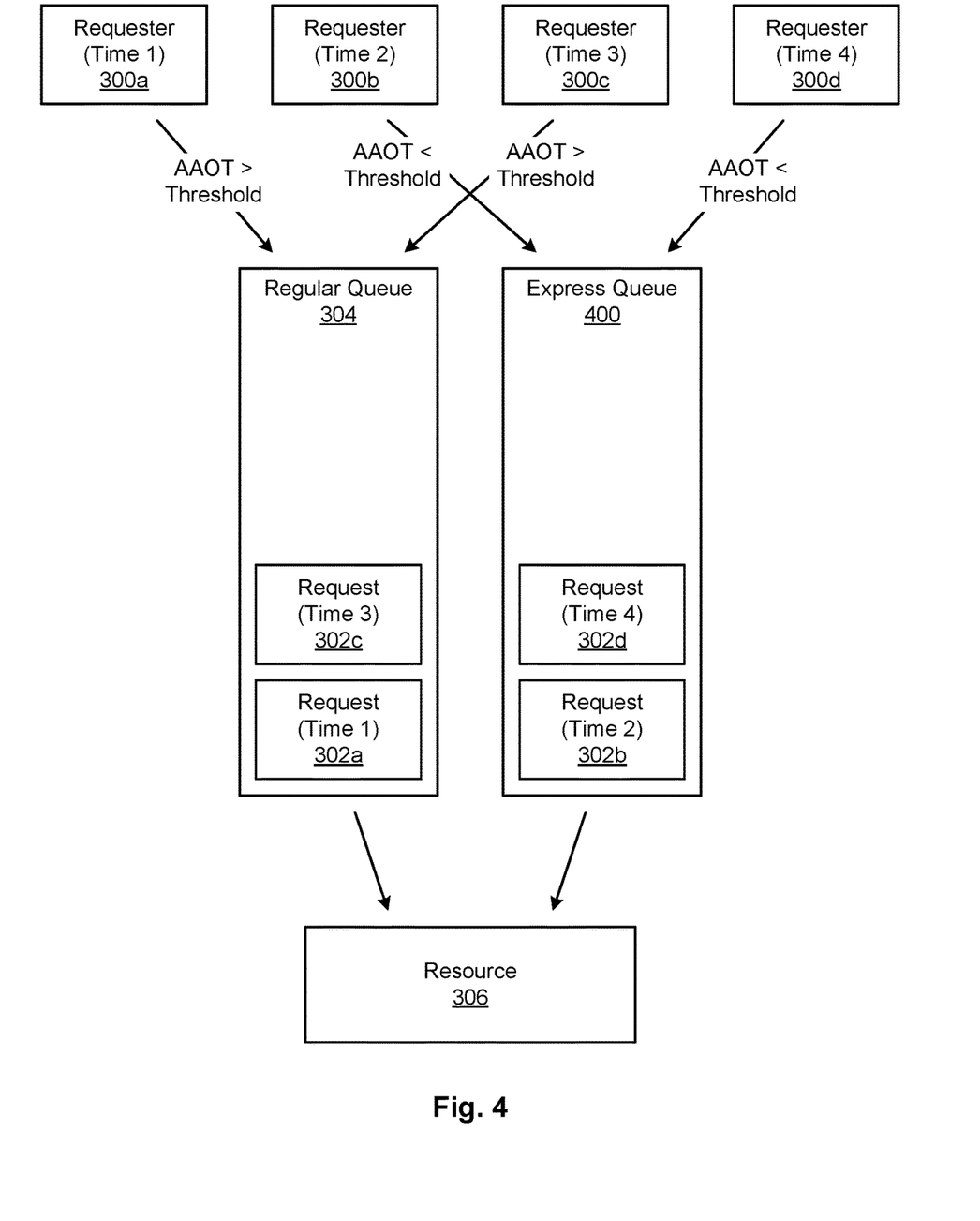
FIG. 4 is a high-level block diagram showing a new express queue used to more efficiently serialize access to a resource.

Referring to FIG. 4, in order to more efficiently allocate a resource 306 to multiple requesters 300, systems and methods in accordance with the invention may utilize an additional queue 400, hereinafter referred to as an "express" queue 400, in addition to the regular queue 304. The express queue 400 may be used for requesters 300 that are expected to control a resource 306 for a shorter period of time. The regular queue 304, by contrast, may be used for requesters 300 that are expected to control a resource 306 for a longer period of time. Requests 302 allocated to the express queue 400 may be given priority over requests 302 allocated to the regular queue 304. That is, with some possible exceptions, requests 302 allocated to the express queue 400 will be executed before requests 302 allocated to the regular queue 304. In this way, requesters 300 that are expected to control a resource 306 for a longer period of time will not hold up requesters 300 that are executed to control the resource 306 for a shorter period of time.

In certain embodiments, a threshold may be established in order to determine how to allocate requests 302 to the regular queue 304 and the express queue 400. The threshold may correspond to an amount of time a requester 300 is expected to control a resource 306. If a requester 300 is anticipated to control the resource 306 for more than the threshold amount of time, the associated request 302 may be allocated to the regular queue 304. If, on the other hand, the requester 300 is anticipated to control the resource 306 for less than the threshold amount of time, the associated request 302 may be allocated to the express queue 400.

This process is shown in FIG. 4. Assume for the sake of example that the anticipated amount of time (AAOT) associated with requests 302a, 302c from requesters 300a, 300c is greater than the threshold, and the AAOT associated with requests 302b, 302d from requesters 300b, 300d is less than the threshold. In such a scenario, the requests 302a, 302c would be assigned to the regular queue 304 and the requests 302b, 302d would be assigned to the express queue 400. The requests 302b, 302d in the express queue 400 would be given priority over the requests 302a, 302c in the regular queue 304. In certain embodiments, the requests 302 in each queue 304, 400 are executed in the order they are received into the queues 304, 400. In other embodiments, the requests 302 in each queue 304, 400 are ordered according to different criteria, such as the amount of time they are expected to control the resource 306.

In certain embodiments, the threshold discussed above and shown in FIG. 4 is a fixed value. In other embodiments, the threshold is an adjustable value, potentially adjustable by a user. In certain embodiments, the threshold may be dynamically adjusted in accordance with the utilization of the regular queue 304 and the express queue 400. For example, if requests 302 are being executed in the express queue 400 in a manner that starves requests 302 in the regular queue 304, the threshold may be adjusted to allocate more requests 302 to the regular queue 304 and less to the express queue 400. Ideally, this will ensure that more resource time is allocated to requests 302 in the regular queue 304. Thus, in certain embodiments, the threshold may be modified in accordance with how the regular queue 304 and express queue 400 are performing.

In order to allocate requests 302 to the regular queue 304 and express queue 400, systems and methods are needed to determine how long a requester 300 is expected to control a resource 306. In certain embodiments, systems and methods in accordance with the invention analyze historical records indicating how long particular requesters 300 (e.g., jobs, processes, programs, applications, etc.) controlled the resource 306 in the past. For example, System Management Facility (SMF) records and more specifically Resource Measurement Facility (RMF) records may store data (e.g., numerical values such as historical averages) that indicates how long a particular requester 300 controlled a resource 306 in the past. This may provide a good indication of how the requester 300 will control the resource 306 in the future and may provide the basis for determining whether a request 302 will be assigned to the regular queue 304 or the express queue 400. In certain embodiments, SMF records may be mined to create a table of requesters 300 that only hold a resource 306 for a short period of time. When a request 302 to hold the resource 306 is received, this table may be referenced to determine whether to assign the request 302 to the express queue 400 or the regular queue 304.

When data regarding pass hold times is unavailable, a default value may be applied to a request 302 associated with a particular requester 300. This default value may, in certain embodiments, be updated as actual data is acquired regarding how long the requester 300 controls the resource 306. In other embodiments, systems and methods in accordance with the invention may enable a user to set how long a particular requester 300 (e.g., job, process, etc.) controls a resource 306. This setting may affect the queue 304, 400 that the request 302 is assigned to.

In yet other embodiments, systems and methods in accordance with the invention may enable a user to designate, for a requester 300, which queue 304, 400 requests 302 should be assigned to. This may occur regardless of how long the requester 300 actually needs to control the resource 306. For example, if a job or process is deemed by a user to be particularly important, the user may designate that requests 302 associated with this job or process are always assigned to the express queue 400. Similarly, if a job or process is deemed to be relatively unimportant, requests 302 associated with the job or process may be assigned to the regular queue 304 regardless of how long the job or process actually needs to control the resource 306. Thus, in certain embodiments, a user may be provided some control as to how requests 302 associated with a particular requester 300 are assigned to the regular queue 304 and express queue 400.

Figure 5:
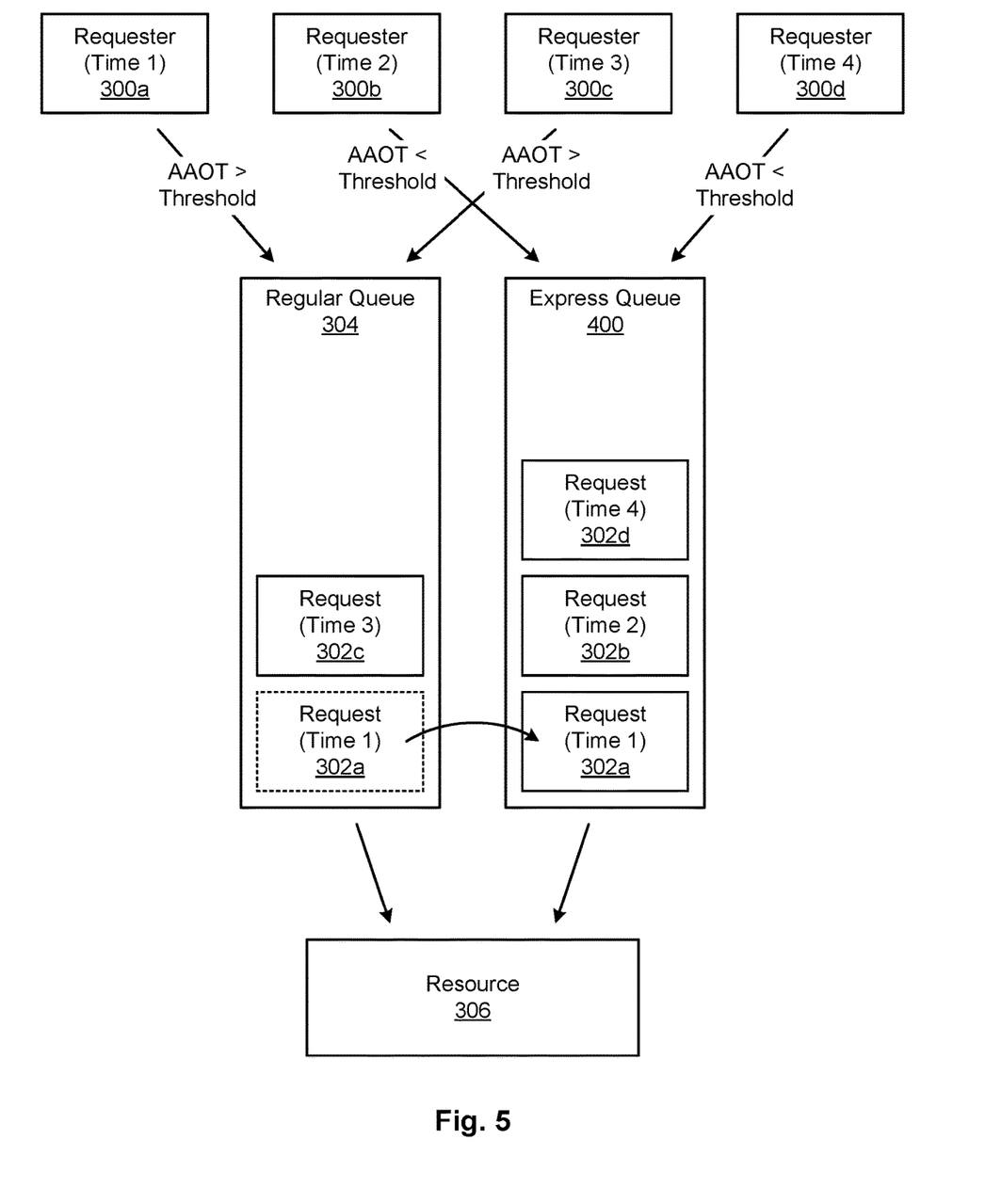
FIG. 5 is a high-level block diagram showing promotion of a request from the regular queue to the express queue to prevent starvation of requests in the regular queue.

Referring to FIG. 5, in certain embodiments, various safeguards may be put in place to prevent starvation of requests 302 in the regular queue 304. Such starvation may occur, for example, if the express queue 400 constantly contains requests 302 that are being executed and requests 302 in the regular queue 304 therefore never or rarely have a chance to execute. This may also occur if requests 302 in the regular queue 304 back up to a point where wait times for the regular queue 304 increase to an unacceptable level.

In certain embodiments, as shown in FIG. 5, safeguards may be put in place to promote certain requests 302 from the regular queue 304 to the express queue 400 when certain conditions or criteria are met. This promotion may occur to the front or back of the line in the express queue 400. This will ensure that requests 302 initially assigned to the regular queue 304 will be executed. For example, a safeguard may be established to periodically decrease the AAOT associated with a particular request 302a by a certain amount or percentage until the request 302a eventually qualifies for placement in the express queue 400, as shown in FIG. 5. In the illustrated example, the request 302a is promoted to the front of the line in the express queue 400.

Figure 6:
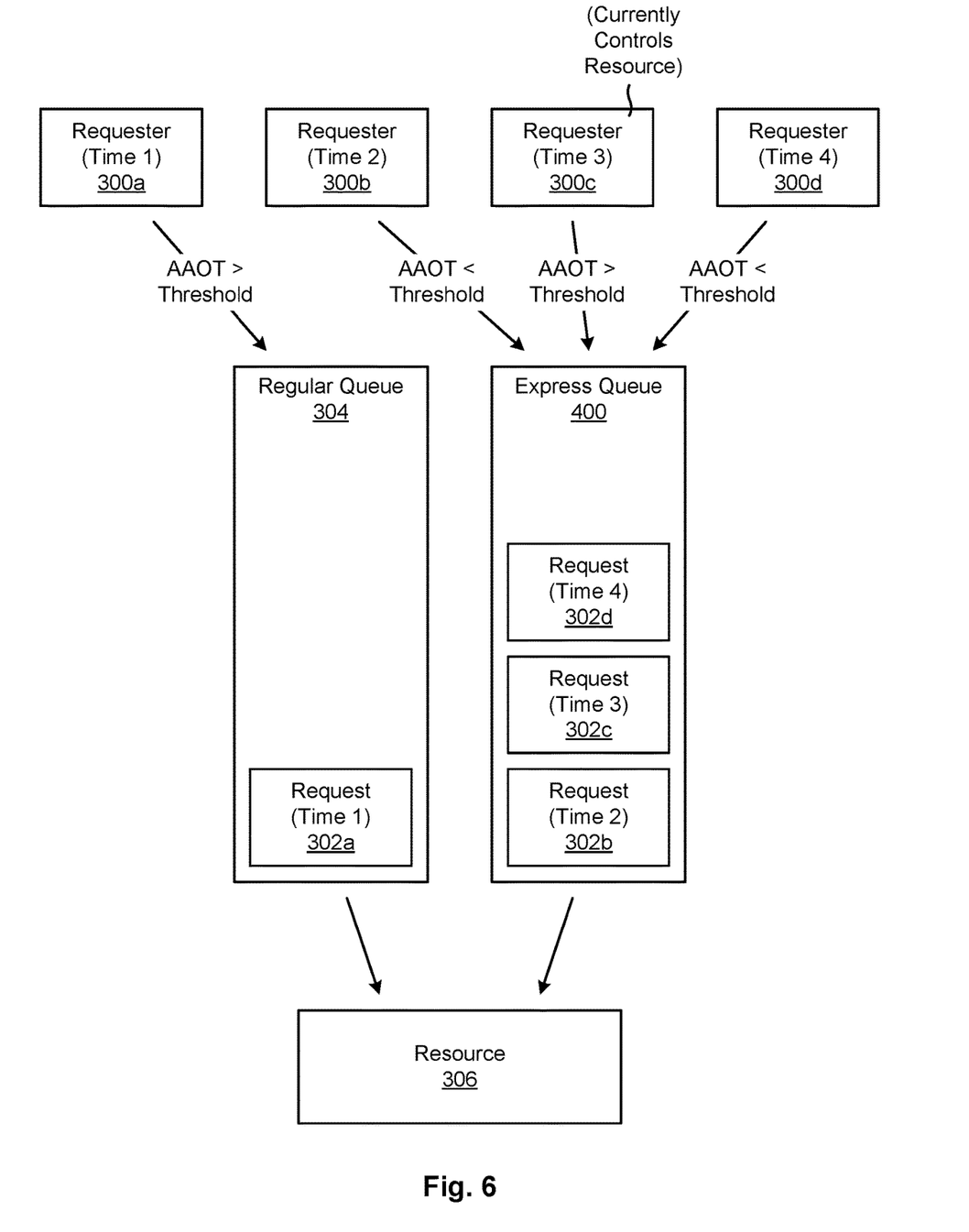
FIG. 6 is a high-level block diagram showing utilization of the express queue for a requester that currently controls another resource.

Referring to FIG. 6, in other embodiments, the queue 304, 400 in which a request 302 is placed may depend on whether a requester 300 associated with the request 302 currently controls other resources. For example, if a requester 300c controls a first resource and then makes a request 302c to control a second resource 306 before the first resource has been released, the request 302c may be assigned to the express queue 400 regardless of the anticipated amount of time the requester 300c needs to control the second resource 306. This may be performed to minimize the amount of time the requester 300c holds and controls the first resource.

Figure 7:
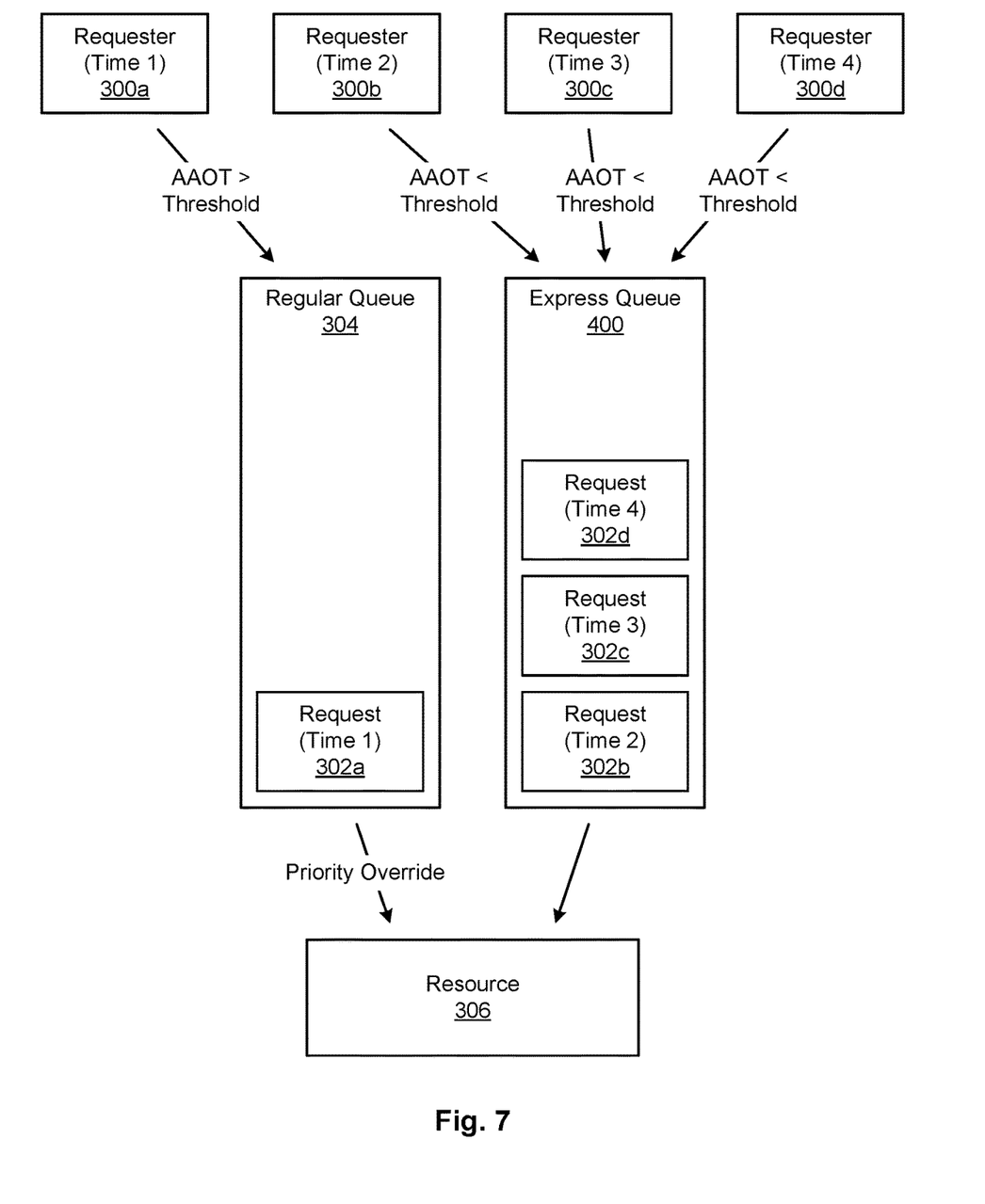
FIG. 7 is a high-level block diagram showing another technique to prevent starvation of requests in the regular queue.

Referring to FIG. 7, other techniques for preventing starvation of requests 302 in the regular queue 304 may be used. For example, certain logic may be put in place to override the priority that requests 302 in the express queue 400 are normally given. For example, if the AAOT of the first request 302 in the regular queue 304 is less than the cumulative AAOT of all the requests 302 in the express queue 400, the first request 302 in the regular queue 304 may be given priority over requests 302 in the express queue 400 and executed next. Thus, requests 302 in the regular queue 304 may, under certain circumstances, by given priority over requests 302 in the express queue 400.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for allocating a computing resource to a plurality of requesters, the method comprising:
   maintaining a regular queue and an express queue, wherein each of the regular queue and the express queue are configured to hold requests to control a computing resource that is separate from the regular queue and the express queue;
   receiving requests to control the computing resource, wherein controlling the resource comprises at least one of exclusively accessing the computing resource and sharing access to the computing resource;
   determining, for each request, an anticipated amount of time that the request needs to control the computing resource;
   in the event the anticipated amount of time for a request is greater than a selected threshold, allocating the request to the regular queue;
   in the event the anticipated amount of time for a request is less than the selected threshold, allocating the request to the express queue; and
   providing priority to requests allocated to the express queue over requests allocated to the regular queue.

2. The method of claim 1, wherein requests allocated to each of the regular queue and express queue are ordered on a first-come, first-serve basis.

3. The method of claim 1, wherein determining the anticipated amount of time comprises analyzing historical records for past requests to determine the anticipated amount of time.

4. The method of claim 1, further comprising taking measures to prevent starvation of requests allocated to the regular queue.

5. The method of claim 4, wherein taking measures comprises adjusting an anticipated amount of time for requests allocated to the regular queue to enable them to qualify for eventual allocation to the express queue.

6. The method of claim 1, further comprising establishing a list of requests that should be allocated to the express queue.

7. The method of claim 1, further comprising enabling a user to establish a default anticipated amount of time for a request.

8. A computer program product for allocating a computing resource to a plurality of requesters, the computer program product comprising a non-transitory computer-readable storage medium having computer-usable program code embodied therein, the computer-usable program code configured to perform the following when executed by at least one processor:
   maintain a regular queue and an express queue, wherein each of the regular queue and the express queue are configured to hold requests to control a computing resource that is separate from the regular queue and the express queue;
   receive requests to control the computing resource, wherein controlling the resource comprises at least one of exclusively accessing the computing resource and sharing access to the computing resource;
   determine, for each request, an anticipated amount of time that the request needs to control the computing resource;
   in the event the anticipated amount of time for a request is greater than a selected threshold, allocate the request to the regular queue;
   in the event the anticipated amount of time for a request is less than the selected threshold, allocate the request to the express queue; and
   provide priority to requests allocated to the express queue over requests allocated to the regular queue.

9. The computer program product of claim 8, wherein requests allocated to each of the regular queue and express queue are ordered on a first-come, first-serve basis.

10. The computer program product of claim 8, wherein determining the anticipated amount of time comprises analyzing historical records for past requests to determine the anticipated amount of time.

11. The computer program product of claim 8, wherein the computer-usable program code is further configured to take measures to prevent starvation of requests allocated to the regular queue.

12. The computer program product of claim 11, wherein taking measures comprises adjusting an anticipated amount of time for requests allocated to the regular queue to enable them to qualify for eventual allocation to the express queue.

13. The computer program product of claim 8, wherein the computer-usable program code is further configured to establish a list of requests that should be allocated to the express queue.

14. The computer program product of claim 8, wherein the computer-usable program code is further configured to enable a user to establish a default anticipated amount of time for a request.

15. A system for allocating a computing resource to a plurality of requesters, the system comprising:
   at least one processor;
   at least one memory device operably coupled to the at least one processor and storing instructions for execution on the at least one processor, the instructions causing the at least one processor to:
      maintain, a regular queue and an express queue, wherein each of the regular queue and the express queue are configured to hold requests to control a computing resource that is separate from the regular queue and the express queue;
      receive requests to control the computing resource, wherein controlling the resource comprises at least one of exclusively accessing the computing resource and sharing access to the computing resource;
      determine, for each request, an anticipated amount of time that the request needs to control the computing resource;
      in the event the anticipated amount of time for a request is greater than a selected threshold, allocate the request to the regular queue;

in the event the anticipated amount of time for a request is less than the selected threshold, allocate the request to the express queue; and provide priority to requests allocated to the express queue over requests allocated to the regular queue.

16. The system of claim 15, wherein requests allocated to each of the regular queue and express queue are ordered on a first-come, first-serve basis.

17. The system of claim 15, wherein determining the anticipated amount of time comprises analyzing historical records for past requests to determine the anticipated amount of time.

18. The system of claim 15, wherein the instructions further cause the at least one processor to take measures to prevent starvation of requests allocated to the regular queue.

19. The system of claim 18, wherein taking measures comprises adjusting an anticipated amount of time for requests allocated to the regular queue to enable them to qualify for eventual allocation to the express queue.

20. The system of claim 15, wherein the instructions further cause the at least one processor to establish a list of requests that should be allocated to the express queue.

\* \* \* \* \*